(12) United States Patent
Boren (10) Patent No.: US 8,967,723 B2
(45) Date of Patent: Mar. 3, 2015

(54) ADJUSTABLE SEAT ASSEMBLY

(71) Applicant: The Boeing Company, Chicago, IL (US)

(72) Inventor: Kelly L. Boren, Marysville, WA (US)

(73) Assignee: The Boeing Company, Chicago, IL (US)

( * ) Notice: Subject to any disclaimer, the term of this patent is extended or adjusted under 35 U.S.C. 154(b) by 115 days.

(21) Appl. No.: 13/688,104

(22) Filed: Nov. 28, 2012

(65) Prior Publication Data

US 2014/0145481 A1    May 29, 2014

(51) Int. Cl.
*A47C 7/54* (2006.01)
*B60N 3/02* (2006.01)
*B64D 11/06* (2006.01)

(52) U.S. Cl.
CPC ............ *B64D 11/0693* (2013.01); *B64D 11/06* (2013.01); *B64D 2011/0613* (2013.01); *B64D 2011/0634* (2013.01); *B64D 2011/0668* (2013.01)
USPC ...... 297/411.32; 297/115; 297/145; 297/233; 297/257

(58) Field of Classification Search
USPC ............... 297/411.33, 411.32, 411.3, 411.37, 297/118, 411.35, 248, 217.3, 233, 234, 246, 297/257, 115, 145; 244/118.5, 118.6; 296/153; 248/429
See application file for complete search history.

(56) References Cited

U.S. PATENT DOCUMENTS

| | | | |
|---|---|---|---|
| 2,310,573 A | 2/1943 | Burton | |
| 3,145,052 A * | 8/1964 | Morgan | 297/354.1 |
| 3,374,032 A * | 3/1968 | Del Giudice | 297/394 |
| 3,392,954 A * | 7/1968 | Malitte | 248/429 |
| 4,768,832 A | 9/1988 | Wain | |
| 4,881,702 A | 11/1989 | Slettebak | |
| 5,104,065 A * | 4/1992 | Daharsh et al. | 244/118.6 |
| 5,131,607 A | 7/1992 | Arnold et al. | |
| 5,193,765 A * | 3/1993 | Simpson et al. | 244/118.6 |
| 5,284,379 A * | 2/1994 | Arnold et al. | 297/113 |
| 5,553,813 A | 9/1996 | Merensky | |
| 5,727,845 A * | 3/1998 | Jackson-Wynch | 297/257 |
| 5,957,407 A | 9/1999 | Auestad | |
| 5,967,594 A | 10/1999 | Ramanujam | |
| 6,076,768 A * | 6/2000 | Durand et al. | 244/118.6 |
| 6,176,547 B1 * | 1/2001 | François et al. | 297/257 |

(Continued)

FOREIGN PATENT DOCUMENTS

| DE | 43 29 452 A1 | 3/1995 |
|---|---|---|
| DE | 4329452 A1 | 3/1995 |

(Continued)

OTHER PUBLICATIONS

Extended European Search Report for European Application No. 13187393.7-1754 mailed on May 8, 2014, 7 pages.

*Primary Examiner* — Chi Q Nguyen
(74) *Attorney, Agent, or Firm* — Toler Law Group, PC (57) ABSTRACT

An aircraft seat assembly including multiple seats together having a total seating area. The aircraft seat assembly also includes an armrest separating a first seat of the multiple seats from a second seat of the multiple seats and a sliding mechanism coupled to the armrest. The sliding mechanism enables movement of the armrest to change a portion of the total seating area that is associated with at least one seat of the multiple seats. The aircraft seat assembly also includes a controller that controls movement of the armrest responsive to a control command.

20 Claims, 9 Drawing Sheets

(56) References Cited

U.S. PATENT DOCUMENTS

| | | | |
|---|---|---|---|
| 6,793,282 B2 * | 9/2004 | Plant et al. | 297/248 |
| 6,824,213 B2 * | 11/2004 | Skelly et al. | 297/217.3 |
| 7,063,386 B2 * | 6/2006 | Dowty et al. | 297/338 |
| 7,517,010 B2 | 4/2009 | Saint-Jalmes et al. | |
| 7,600,819 B2 * | 10/2009 | Armo et al. | 297/411.35 |
| 7,975,962 B2 * | 7/2011 | Jacob | 244/118.6 |
| 8,087,613 B2 * | 1/2012 | Fullerton et al. | 244/118.5 |
| 8,186,760 B2 | 5/2012 | Kneller et al. | |
| 8,376,462 B2 * | 2/2013 | Marini et al. | 297/344.24 |
| 8,528,861 B2 * | 9/2013 | Kneller et al. | 244/118.6 |

FOREIGN PATENT DOCUMENTS

| | | |
|---|---|---|
| EP | 0530920 A1 | 3/1993 |
| EP | 0747286 A2 | 12/1996 |
| GB | 2 288 973 A | 11/1995 |

* cited by examiner

ADJUSTABLE SEAT ASSEMBLY

FIELD OF THE DISCLOSURE

The present disclosure is generally related to an adjustable aircraft seat assembly.

BACKGROUND

Passenger comfort can be a differentiating factor among airlines. Airline passenger comfort can be correlated to space available per passenger. Thus, leg room and seat width differences from airline to airline can distinguish one airline from another for customer satisfaction purposes.

Leg room available for each passenger may be constrained based on a number of rows of seating and a total length of the aircraft available for passenger seating. The ability to vary the leg room available for passengers is limited and changing the available leg room can require time-consuming aircraft reconfiguration. Thus, variations in leg room are made relatively infrequently by individual airlines. Thus, advances in passenger comfort are still needed.

SUMMARY

An aircraft seat assembly is disclosed. The aircraft seat assembly enables adjusting an amount of seating area that is allocated to each seat in a row of seats. The aircraft seat assembly can be manually or automatically adjusted based on factors, such as purchase of addition seat width by an individual passenger or passengers, overall ticket sales associated with the aircraft, or other factors.

In a particular embodiment, an aircraft seat assembly includes multiple seats that together have a total seating area. The aircraft seat assembly includes an armrest separating a first seat of the multiple seats from a second seat of the multiple seats and a sliding mechanism coupled to the armrest. The sliding mechanism enables movement of the armrest to change a portion of the total seating area that is associated with at least one individual seat within the multiple seats assembly. The aircraft seat assembly also includes a controller that controls movement of the armrest responsive to a control command.

In a particular embodiment, an aircraft includes a seat assembly. The seat assembly includes multiple seats that together have a total seating area. The seat assembly also includes an armrest separating a first seat of the multiple seats from a second seat of the multiple seats and a sliding mechanism coupled to the armrest. The sliding mechanism enables movement of the armrest to change a portion of the total seating area that is associated with at least one seat of the multiple seats. The aircraft also includes a controller that controls movement of the armrest responsive to a control command.

In a particular embodiment, a method includes receiving a control command at a controller of a seat assembly. The seat assembly includes multiple seats that together have a total seating area. The seat assembly also includes an armrest separating a first seat of the multiple seats from a second seat of the multiple seats and a sliding mechanism coupled to the armrest. The sliding mechanism enables movement of the armrest to change a portion of the total seating area that is associated with at least one seat of the multiple seats. The seat assembly also includes a locking mechanism that, when engaged, prevents the sliding movement of the armrest. The method includes issuing a control signal from the controller to unlock the locking mechanism responsive to the control command. When the locking mechanism is unlocked, the sliding movement of the armrest is enabled.

The features, functions, and advantages that have been described can be achieved independently in various embodiments or may be combined in yet other embodiments, further details of which are disclosed with reference to the following description and drawings.

DETAILED DESCRIPTION

Figure 1A:
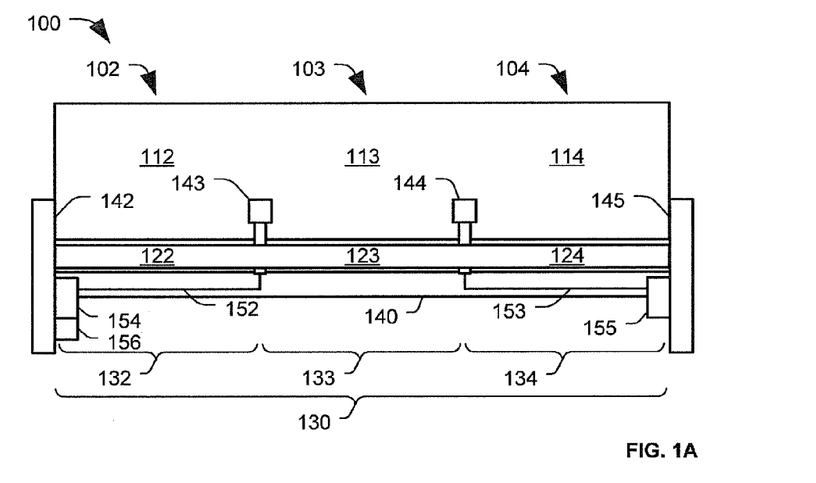
FIG. 1A is a schematic diagram illustrating an aircraft seat assembly in a first configuration according to a particular embodiment.

FIG. 1 illustrates a particular embodiment of an aircraft seat assembly 100. In the particular embodiment illustrated in FIG. 1, the aircraft seat assembly 100 has three seats 102-104 that may be used by different passengers. The aircraft seat assembly 100 has a total seating area 130, which is subdivided into separate seating areas 132-134 by adjustable armrests 143, 144. For example, a first seat 102 is associated with a first seating area 132 corresponding to a first bench portion 122 and a first back portion 112. Similarly, a second seat 103 is associated with a second seating area 133 corresponding to a second bench portion 123 and a second back portion 113. Likewise, a third seat 104 is associated with a third seating area 134 corresponding to a third bench portion 124 and a third back portion 114.

The aircraft seat assembly 100 may also include one or more fixed or stationary armrests, such as a first fixed armrest 142 and a second fixed armrest 145. For example, the fixed armrests 142, 145 may be located at ends of the aircraft seat assembly 100. Additionally, the seats 102-104 may be separated by adjustable or movable armrests, such as the first adjustable armrest 143 and the second adjustable armrest 144.

Although the aircraft seat assembly 100 illustrated in FIG. 1 includes three seats 102-104, in other embodiments the aircraft seat assembly 100 may include more than three seats or fewer than three seats. When more than three seats are included in the aircraft seat assembly 100, additional adjustable armrests (similar to the first adjustable armrest 143 and second adjustable armrest 144) may be provided to delineate separations between adjacent seats. For example, if the aircraft seat assembly 100 includes five seats, the five seats may be separated by four adjustable armrests. When the aircraft seat assembly 100 includes only two seats, only one adjustable armrest (e.g., the first adjustable armrest 143) may be provided to delineate separations between the two seats.

The aircraft seat assembly 100 also includes a sliding mechanism 140. The sliding mechanism 140 is configured to facilitate adjustment of a position of each adjustable armrest 143-144. The sliding mechanism 140 is further illustrated and described with respect to FIGS. 2 and 3. For example, the sliding mechanism 140 may include a rail or other guide positioned below a bench (e.g. corresponding to the bench portions 122-124) of the aircraft seat assembly 100. In this example, a riser of each adjustable armrest 143, 144 may be coupled to the sliding mechanism 140 through a gap between the bench and a back rest (e.g. corresponding to back portions 112-114) of the aircraft seat assembly 100.

The aircraft seat assembly 100 may also include one or more actuators, such as a first actuator 154 and a second actuator 155. The actuators 154 and 155 may be coupled to the adjustable armrests 143 and 144. The actuators 154 and 155 may be operable to move the adjustable armrests 143 and 144 along the sliding mechanism 140 to adjust a portion of the total seating area 130 that is allocated to each seat 102-104 as described further below. The actuators 154, 155 may be pneumatic actuators, hydraulic actuators, electrical actuators, other actuators, or a combination thereof.

The aircraft seat assembly 100 may also include or be coupled to (e.g., in communication with) a controller 156. The controller 156 may be component of the seat assembly 110, as illustrated in FIG. 1A. Alternately, the controller 156 may be a component of an aircraft that includes the aircraft seat assembly 100 and may be coupled to multiple seat assemblies of the aircraft.

The controller 156 may be coupled to the actuators 154, 155 and may control operation of the actuators 154, 155. For example, the controller 156 may send a control signal to one or more of the actuators 154, 155 to adjust one or more of the adjustable armrests 143, 144. The controller 156 may generate the control signal responsive to information (such as a control command) received from a user terminal. For example, the controller 156 may receive information from a remote terminal (i.e., a terminal that is not onboard the aircraft that includes the aircraft seat assembly 100), such as a ticketing terminal or airline agent terminal. To illustrate, the ticketing terminal may provide information directing the controller 156 to adjust a seat configuration of the aircraft seat assembly 100 based on passenger ticket sales associated with the aircraft, based on a purchase of a particular seating arrangement by one or more passengers, or for other purposes. In another example, the controller 156 may receive information from a terminal that is onboard the aircraft associated with the aircraft seat assembly 100, such as a portable flight crew terminal. To illustrate, the portable flight crew terminal may be used by aircraft flight crew personnel to facilitate transactions to purchase additional seating space or other seat reconfiguration options. In a particular embodiment, the actuators 154, 155 inhibit manual readjustment of the adjustable armrests 143, 144, thereby acting as a locking mechanism to prevent sliding movement of the adjustable armrests 143, 144 when the manual readjustment has not been authorized (i.e., when the controller 156 has not provided the control signal to the actuators 154, 155).

Figure 1B:
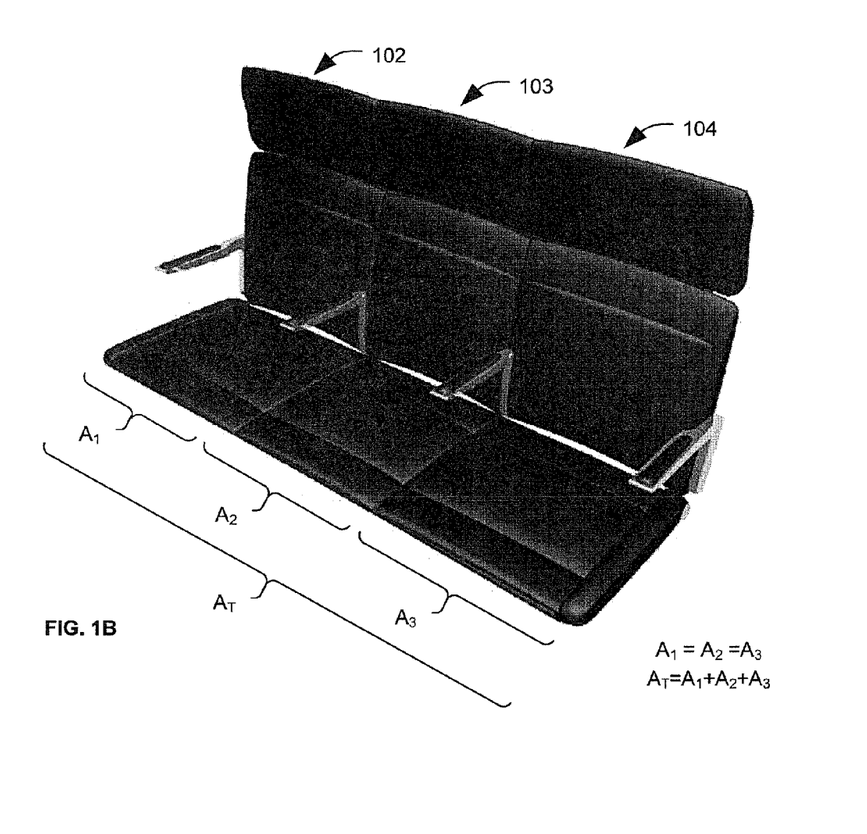
FIG. 1B is a perspective side view of the aircraft seat assembly of FIG. 1A.

FIG. 1B illustrates a total seating area, $A_T$, divided between a first seating area, $A_1$, corresponding to the first seat 102, a second seating area, $A_2$, corresponding to the second seat 103, and a third seating area, $A_3$, corresponding to the third seat 104. As shown in FIG. 1B, the total seating area $A_T$ is equal to the sum of the first seating area $A_1$, the second seating area $A_2$, and the third seating area $A_3$. In the configuration illustrated in FIGS. 1A and 1B, the first seating area $A_1$, the second seating area $A_2$, and the third seating area $A_3$ are equal. That is, the first seat 102, the second seat 103, and the third seat 104 each have approximately equal portions of the total seating area $A_T$. Other configurations of the seats 102-104 are enabled by sliding the armrests along the sliding mechanism 140 as described further with reference to FIGS. 4A-7B.

Figure 2:
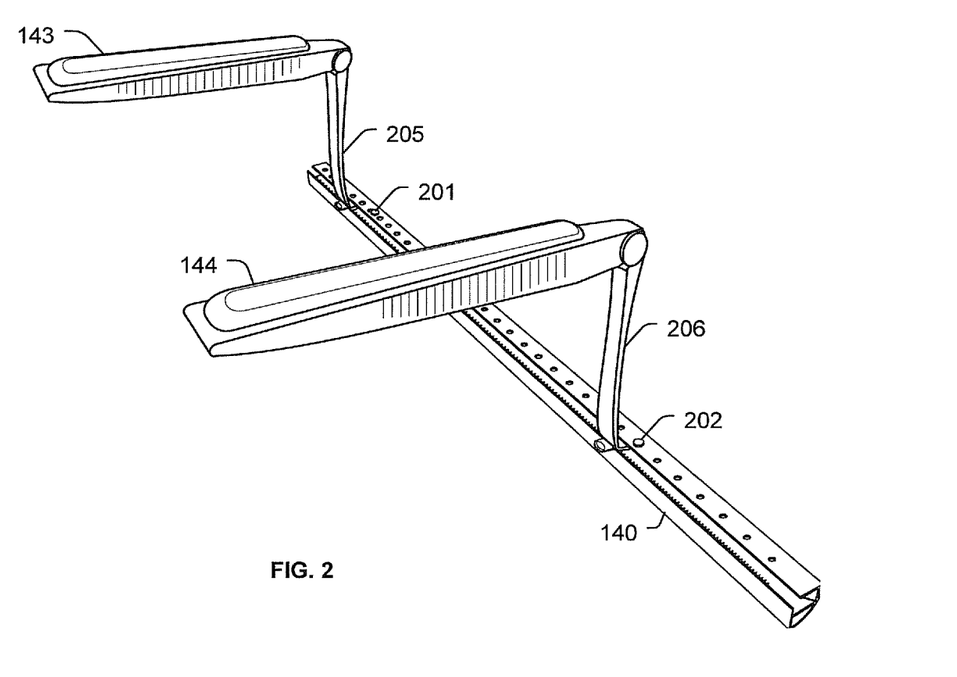
FIG. 2 illustrates a first perspective view of a particular embodiment of a sliding mechanism and an adjustable armrest of an aircraft seat assembly according to a particular embodiment.

FIG. 2 illustrates a perspective view of a particular embodiment of the sliding mechanism 140 and the adjustable armrests 143 and 144. In the embodiment illustrated in FIG. 2, each of the adjustable armrests 143 and 144 is associated with a riser, such as a first riser 205 associated with the first adjustable armrest 143 and a second riser 206 associated with the second adjustable armrest 144. The risers 205, 206 are configured to project through a space between the bench and backrest portions of the aircraft seat assembly 100 of FIGS. 1A and 1B.

The sliding mechanism 140 may include a rail, such as an extruded aluminum rail. The rail may include or be coupled to a locking mechanism. For example, the locking mechanism may include one or more pins 201, 202 that project through openings in the rail to inhibit movement of the adjustable armrests 143, 144 along the sliding mechanism 140. In a particular embodiment, the pins 201, 202 are coupled to or project from a base portion (shown in FIG. 3) of the risers 205, 206. In this embodiment, an armrest may be unlocked to enable sliding motion via rotation of the armrest and the corresponding riser. For example, rotating the first adjustable armrest 143 and the first riser 205 around an axis parallel to a long dimension of the rail (e.g., lifting the first adjustable armrest 143 toward the backrest of the aircraft seat assembly 100 while the base portion of the first riser 205 is retained in the rail) may release the locking mechanism (e.g., may remove the pin 201 from the corresponding opening in the rail). In another embodiment, the pins 201, 202 may be released from the rail in some other manner, such as by depressing a spring-loaded portion of the pins 201, 202 through the corresponding openings, or removing the pins 201, 202 from tops or bottoms of the corresponding openings. The locking mechanism may be unlocked automatically (e.g., by one or more of the actuators 154, 155 of FIG. 1, or another mechanism (not shown)), or manually (e.g., by a passenger or flight crew personnel).

Figure 3:
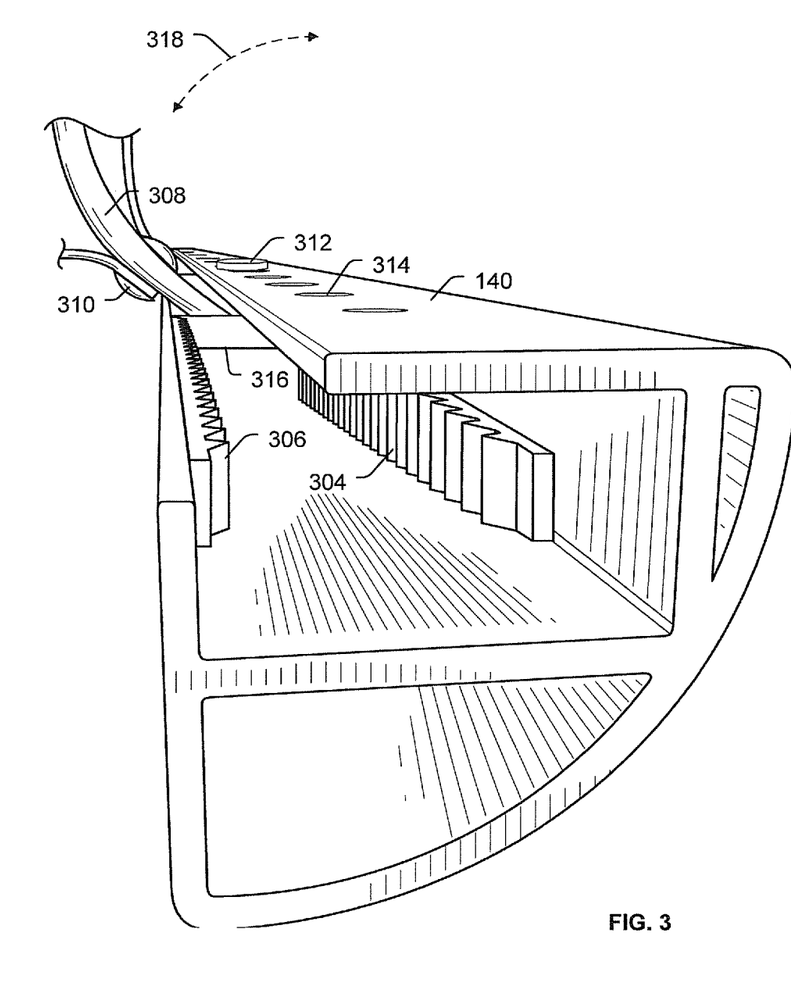
FIG. 3 illustrates a second perspective view of a particular embodiment of a sliding mechanism and an adjustable armrest of an aircraft seat assembly according to a particular embodiment.

FIG. 3 illustrates a perspective side view of a particular embodiment of the sliding mechanism 140. In the particular embodiment illustrated in FIG. 3, the sliding mechanism 140 includes teeth 304 and 306 that are configured to engage a base portion 316 of a riser 308 of an armrest. The sliding mechanism 140 also includes one or more openings 314 adapted to receive a pin 312 or other retaining member. The pin 312 or other retaining member may project through a corresponding opening of the one or more openings 314 to inhibit sliding motion of the armrest associated with the riser 308. Additionally, or in the alternative, the base portion 316 of the riser 308 may engage the teeth 304, 306 to inhibit sliding motion of the armrest associated with the riser 308. Thus, the pin 312 or other retaining member in cooperation with one or more of the openings 314, the base portion 316 in cooperation with the teeth 304, 306, or a combination thereof, may be referred to as a locking mechanism.

In a particular embodiment, the riser 308 may include or be coupled to a seatbelt harness fastener 310. The seatbelt harness fastener 310 may retain a seatbelt that is coupled to the armrest associated with the riser 308 such that when the riser 308 moves along the sliding mechanism 140 an anchoring position of the seatbelt harness moves in a corresponding manner. Thus, by moving the armrest along the sliding mechanism 140, a position of an anchoring point of the seatbelt harness may also be moved.

In a particular embodiment, the armrest associated with the riser 308 may be rotated (e.g., along a path 318) to engage or disengage the locking mechanism (e.g., in response to a control signal from the controller 156 of FIG. 1). For example, an actuator (such as one or more of the actuators 154, 155) may be positioned above or below the sliding mechanism 140. The actuator may be configured to engage and/or disengage a locking mechanism (e.g., to engage and/or disengage the riser 308 from the teeth 304, 306, to engage and/or disengage the pin 312 from the corresponding opening, or a combination thereof) by tilting the riser 308 (i.e., rotating the armrest and the riser 308 in a first direction along the path 318).

The actuator may also, or in the alternative, slide the armrest and the riser 308 along the sliding mechanism 140 (e.g., in response to a control signal from the controller 156 of FIG. 1) to adjust the position of the armrest and the riser 308. At a designated position, the actuator may re-engage the locking mechanism (e.g., by rotating the riser 308 in a second direction along the path 318 to engage the teeth 304, 306, the pin 312, or both). Thus, the sliding mechanism 140 in cooperation with the actuator may automatically (e.g., based on one or more control signals) reposition one or more of the armrests and, correspondingly, automatically reposition the seatbelt harness fastener 310 and the seatbelt harness. Accordingly, the sliding mechanism 140 in cooperation with one or more actuators enables dynamic reconfiguration of aircraft seating to accommodate passengers with particular needs (such as large passengers), to accommodate passenger purchase of additional seating space, to accommodate particular ticket sale arrangements (such as upgraded tickets associated with increased seating area), for other purposes (e.g., to reposition the seatbelt harness to accommodate a child safety seat), or a combination thereof.

FIGS. 4A and 4B, 5A and 5B, 6A and 6B, and 7A and 7B illustrate other configurations of seating that can be achieved using the aircraft seat assembly 100. In a neutral seating configuration (as shown in FIGS. 1A and 1B), each of the seats 102-104 has an equal seating area (i.e., $A_1=A_2=A_3$). In a particular embodiment, each of the seats 102-104 may have a width of approximately 18.5 inches in the neutral seating configuration. In an unequal seating configuration, one or more of the seats 102-104 may have a larger seating area (e.g., a greater width) than another of the seats 102-104. A difference in the seating area associated with each seat may be limited by range of motion of the adjustable armrests 143, 144. To illustrate, in a particular embodiment, each of the adjustable armrests 143, 144 is movable through a range of motion that is approximately equal to a half of a width of the aircraft seat assembly 100. That is, the first adjustable armrest 143 may be moved to any point (or to particular incrementally spaced points) between a center of the aircraft seat assembly 100 and abutting the first fixed armrest 142. Similarly, the second adjustable armrest 144 may be moved to any point (or to particular incrementally spaced points) between the center of the aircraft seat assembly 100 and abutting the second fixed armrest 145. In another embodiment, the adjustable armrests 143, 144 may be moveable through a more limited range of motion, such as to any point (or to particular incrementally spaced points) within about 10 inches or within about 12 inches from a neutral position corresponding to the neutral seating configuration. In yet another embodiment, the adjustable armrests 143, 144 may be moveable to predetermined locations corresponding to seating configurations that are likely to be desirable, such as two or more of the seating configurations of FIGS. 1A and 1B, 4A and 4B, 5A and 5B, 6A and 6B, or 7A and 7B.

Figure 4A:
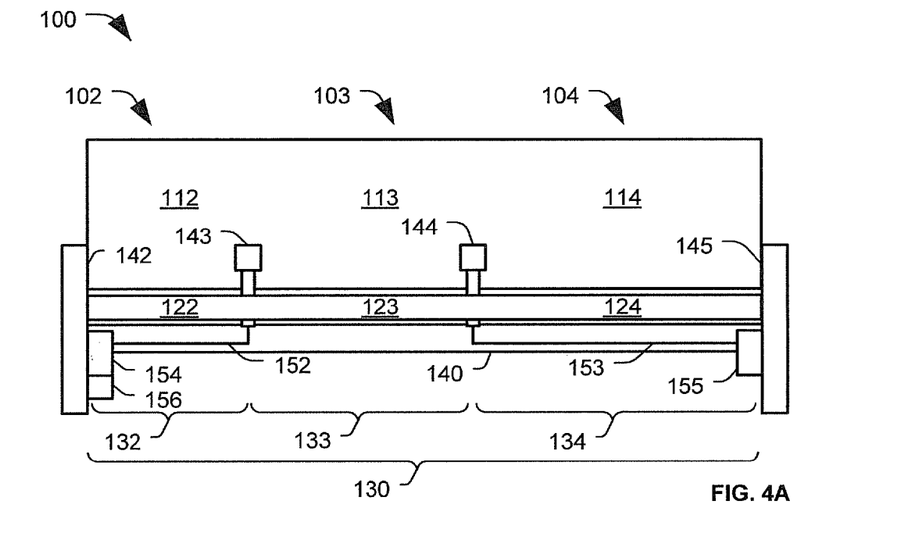
FIG. 4A is a schematic diagram illustrating an aircraft seat assembly in a second configuration according to a particular embodiment.
Figure 4B:
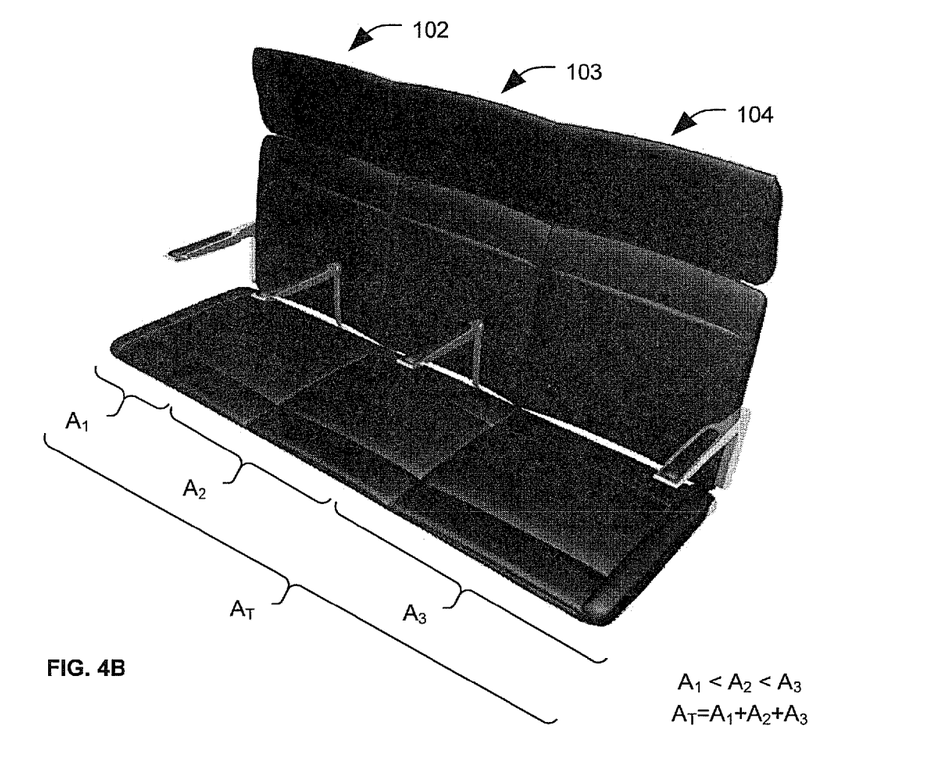
FIG. 4B is a perspective side view of the aircraft seat assembly of FIG. 4A.

As illustrated in FIGS. 4A and 4B, the aircraft seat assembly 100 is arranged in a second seating configuration that is different than the seating configuration illustrated in FIGS. 1A and 1B. In the second seating configuration, the total seating area 130 is divided such that the first seating area 132 (corresponding to $A_1$) associated with the first seat 102 is less than the second seating area 133 (corresponding to $A_2$) associated with the second seat 103, which is less than the third seating area 134 (corresponding to $A_3$) associated with the third seat 104. Stated another way, the first seat 102 has less seating area than the second seat 103 (i.e., $A_1<A_2$), and the second seat 103 has less seating area than the third seat 104 (i.e., $A_2<A_3$). For example, when each of the seats 102-104 has a width of 18.5 inches in the neutral seating configuration, in the second seating configuration the first seat 102 may have a width of about 12.5 inches, the second seat 103 may have a width of about 18.5 inches, and the third seat 104 may have a width of about 24.5 inches. Thus, for example, the second seating configuration of FIGS. 4A and 4B may be useful or desirable for a family travelling together where a child or smaller individual may be positioned in the first seat 102, a standard adult individual may be seated in the second seat 103, and a larger individual may be seated in the third seat 104. In another example, the second seating configuration of FIGS. 4A and 4B may be useful or desirable when no passenger is seated in the first seat 102.

Figure 5A:
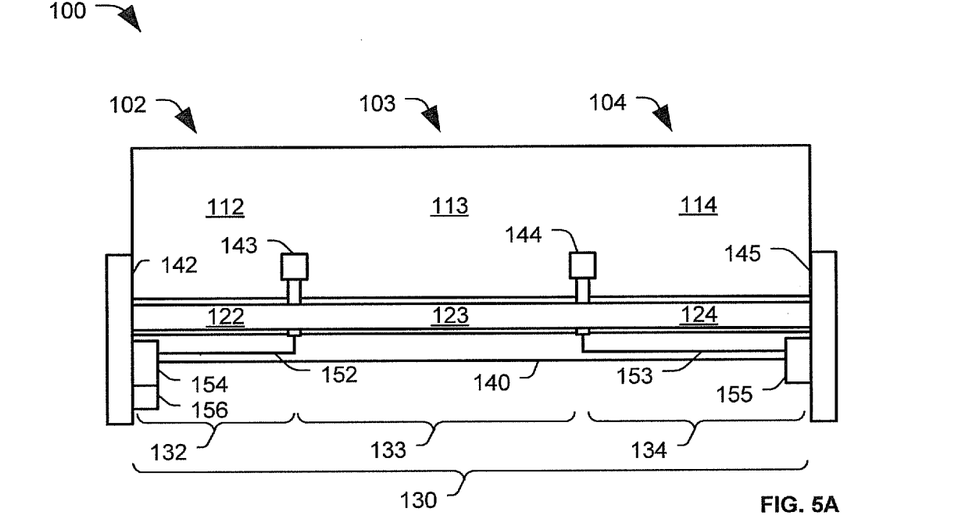
FIG. 5A is a schematic diagram illustrating an aircraft seat assembly in a third configuration according to a particular embodiment.
Figure 5B:
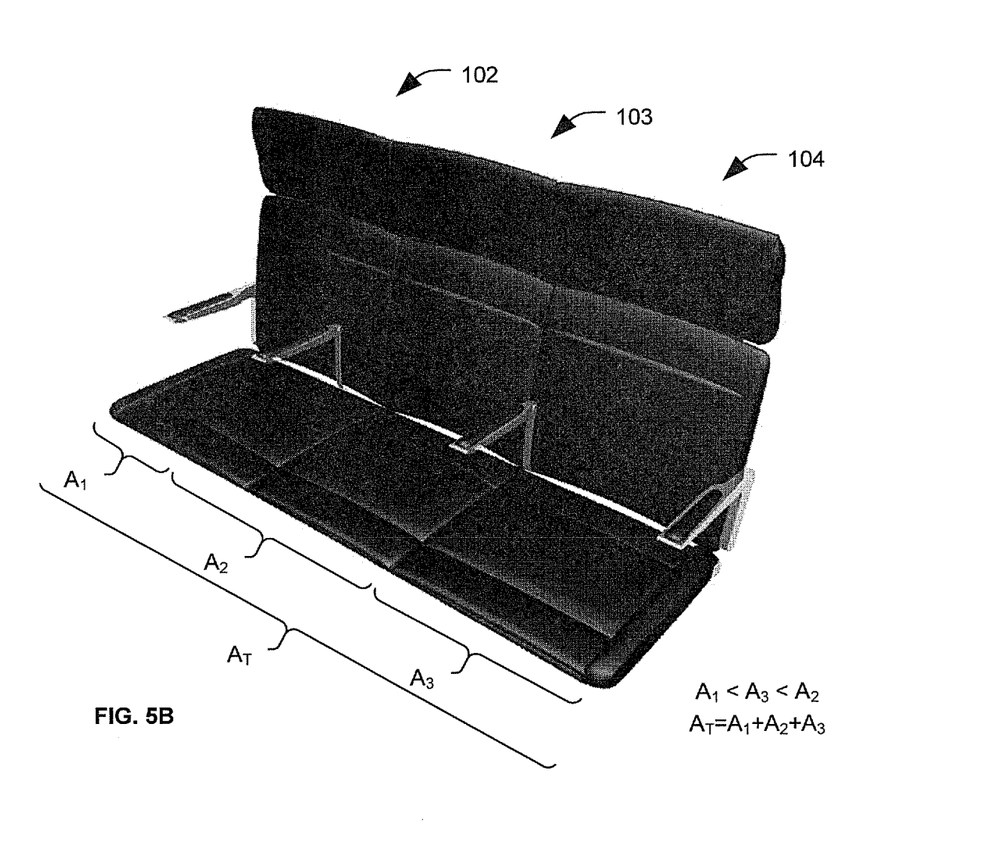
FIG. 5B is a perspective side view of the aircraft seat assembly of FIG. 5A.

As illustrated in FIGS. 5A and 5B, the aircraft seat assembly 100 is arranged in a third seating configuration. In the third seating configuration, the total seating area 130 is divided such that the first seating area 132 (corresponding to $A_1$) associated with the first seat 102 is less than the third seating area 134 (corresponding to $A_3$) associated with the third seat 104, which is less than the second seating area 133 (corresponding to $A_2$) associated with the second seat 103. The first seat 102 has less seating area than the third seat 104 (i.e., $A_1<A_3$), and the third seat 104 has less seating area than the second seat 103 (i.e., $A_3<A_2$). For example, when each of the seats 102-104 has a width of 18.5 inches in the neutral seating configuration, in the third seating configuration the first seat 102 may have a width of about 12.5 inches, the third seat 104 may have a width of about 18.5 inches, and the second seat 103 may have a width of about 24.5 inches.

The second seating configuration of FIGS. 4A and 4B and the third seating configuration of FIGS. 5A and 5B illustrate different arrangements of three distinct seating area sizes. Although drawings are not provided to illustrate them, other configurations with three distinct seating area sizes can also be achieved using the aircraft seat assembly 100. For example, a largest seating area may be allocated to the first seat 102 with either the second seat 103 or the third seat 104 being allocated a smallest seating area. Additionally, although examples of the seating areas corresponding to particular widths have been described, other seat widths can also be achieved depending on how far each adjustable armrest 143, 144 is moved from the neutral position.

Figure 6A:
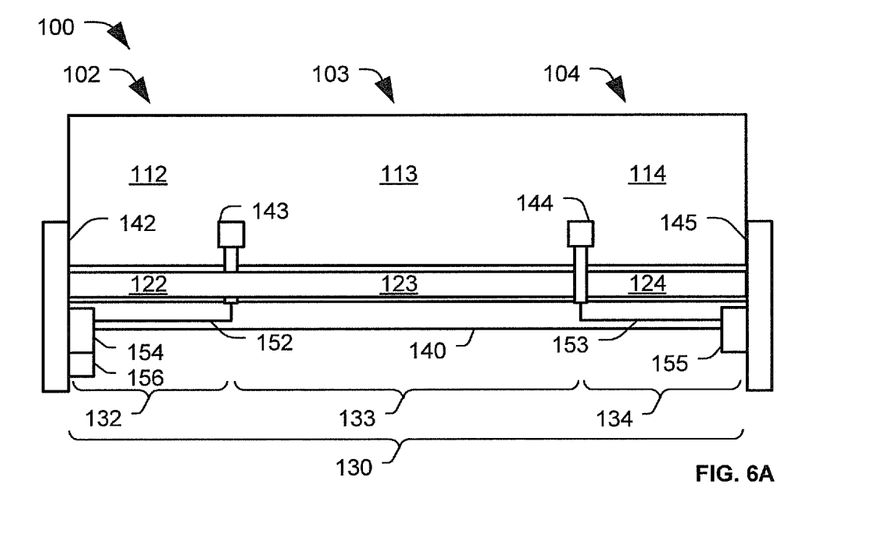
FIG. 6A is a schematic diagram illustrating an aircraft seat assembly in a fourth configuration according to a particular embodiment.
Figure 6B:
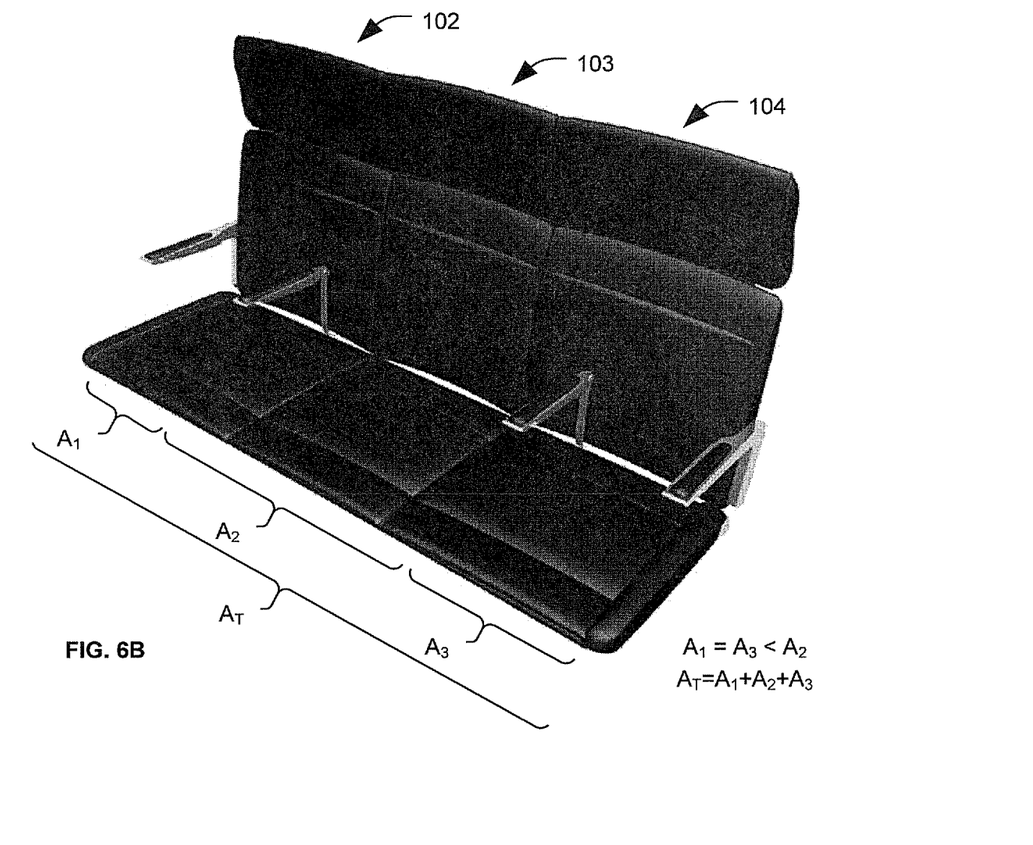
FIG. 6B is a perspective side view of the aircraft seat assembly of FIG. 6A.

As illustrated in FIGS. 6A and 6B, the aircraft seat assembly 100 is arranged in a fourth seating configuration. In the fourth seating configuration, the total seating area 130 is divided such that the first seating area 132 (corresponding to $A_1$) associated with the first seat 102 is equal to the third seating area 134 (corresponding to $A_3$) associated with the third seat 104, and the second seating area 133 (corresponding to $A_2$) associated with the second seat 103 is larger than both the first seating area 132 and the third seating area 134. Stated another way, the first seat 102 and the third seat 104 have equal seating area (i.e., $A_1=A_3$), and the second seat 103 has more seating area than both the first seat 102 and the third seat 104 (i.e., $A_1=A_3<A_2$). For example, when each of the seats 102-104 has a width of 18.5 inches in the neutral seating configuration, in the fourth seating configuration the first seat 102 and the third seat 104 may have a width of about 12.5 inches, and the second seat 103 may have a width of about 30.5 inches. The fourth seating configuration may be useful for or desirable for an adult seated in the second seat 103 travelling with two children seated in the first seat 102 and the third seat 104. As explained above, although not specifically illustrated, in other embodiments, a largest seating area may be allocated to a different seat than the second seat 103. Additionally, although examples of the seating areas corresponding to particular widths have been described, other seat widths can also be achieved depending on how far each adjustable armrest 143, 144 is moved from the neutral position.

Figure 7A:
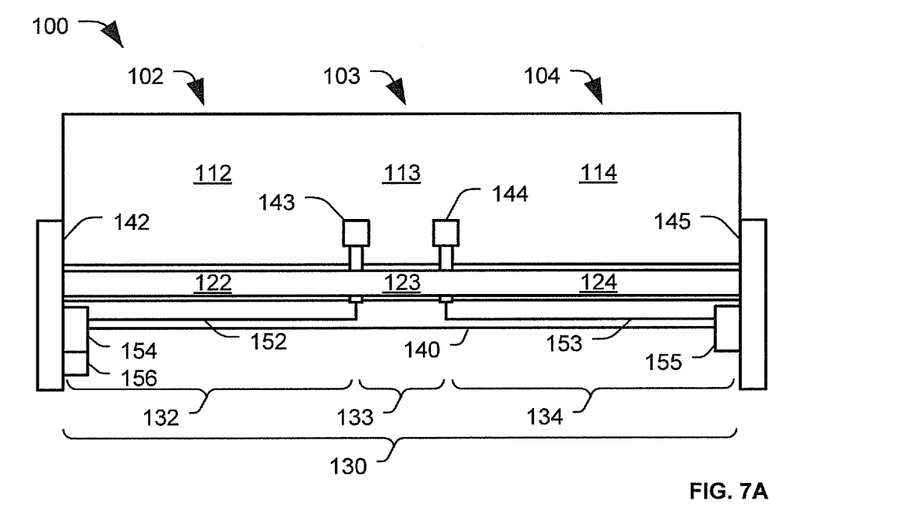
FIG. 7A is a schematic diagram illustrating an aircraft seat assembly in a fifth configuration according to a particular embodiment.
Figure 7B:
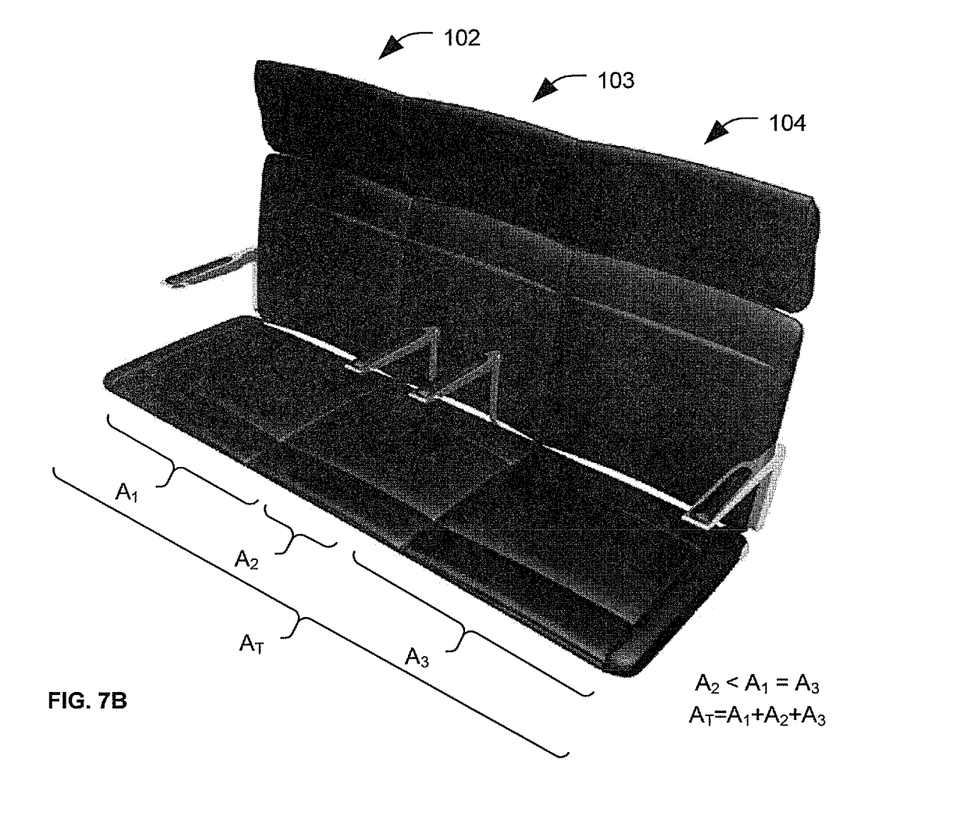
FIG. 7B is a perspective side view of the aircraft seat assembly of FIG. 7A.

As illustrated in FIGS. 7A and 7B, the aircraft seat assembly 100 is arranged in a fifth seating configuration. In the fifth seating configuration, the total seating area 130 is divided such that the first seating area 132 (corresponding to $A_1$) associated with the first seat 102 is equal to the third seating area 134 (corresponding to $A_3$) associated with the third seat 104, and the second seating area 133 (corresponding to $A_2$) associated with the second seat 103 is smaller than both the first seating area 132 and the third seating area 134. Stated another way, the first seat 102 and the third seat 104 have equal seating area (i.e., $A_1=A_3$), and the second seat 103 has less seating area than both the first seat 102 and the third seat 104 (i.e., $A_2<A_1=A_3$). For example, when each of the seats 102-104 has a width of 18.5 inches in the neutral seating configuration, in the fifth seating configuration the first seat 102 and the third seat 104 may have a width of about 24.5 inches, and the second seat 103 may have a width of about 6.5 inches. The fifth seating configuration may be useful for or desirable for two adult seated in the first seat 102 and the third seat 104. In the fifth configuration, one of the seats may be essentially eliminated or rendered unusable for seating. As explained above, although not specifically illustrated, in other embodiments, a smallest seating area may be allocated to a different seat than the second seat 103. Additionally, although examples of the seating areas corresponding to particular widths have been described, other seat widths can also be achieved depending on how far each adjustable armrest 143, 144 is moved from the neutral position.

The seating configurations described above (and others) can be can be achieved by using the adjustable armrests 143, 144 to divide the total seating area 130 between two or more adjacent seats of the aircraft seat assembly 100. Seating configurations that can be achieved may provide for approximately equal portions of the total seating area 130 to be associated with each of the seats 102-104 or for unequal portions of the total seating area 130 to be associated with each of the seats 102-104. In particular configurations, a useable number of seats of the aircraft seat assembly 100 can be changed. For example, by sliding the adjustable armrests 143, 144 to abut the fixed armrests 142, 145, the entire aircraft seat assembly 100 may be converted to a single usable seat. In another example, by sliding the adjustable armrests 143, 144 toward a center of the aircraft seat assembly, the aircraft seat assembly 100 may be converted to two usable seats.

The aircraft seat assembly 100 is configured such that when the seating area is rearranged, seatbelt harnesses anchor points are also rearranged to enable comfortable positioning of a seatbelt throughout the range of available seating configuration. Since the aircraft seat assembly 100 may be associated with the actuators 154 and 155 and the controller 156, seating configurations may be adjusted dynamically. To illustrate, the seating configuration may adjusted based on ticket sales associated with the aircraft. For example, a passenger may purchase an upgraded seat (e.g., with a larger seat width than a neutral seat width of the neutral configuration). In this example, a ticketing terminal (outside the aircraft) or a portable terminal (inside the aircraft) may send a control command indicating a configuration change to the controller 156, and the controller 156 may control the actuators 154, 155 to change a seating configuration of the aircraft seat assembly 100. Thus, while an aircraft is at a terminal awaiting boarding for a particular flight, the seating of the aircraft may be reconfigured based on ticket sales associated with the particular flight. In another example, subsequent to boarding the aircraft, the portable terminal may be used to adjust the seating configuration to accommodate passengers with special needs. In this example, the portable terminal may be controlled by flight crew of the aircraft (as a courtesy to the passengers or in response to onboard payment transactions).

In a particular embodiment, the sliding mechanism 140 can be activated by a passenger (rather than or in addition to by a member of a flight crew). For example, based on ticket sales or based on passenger requests during boarding or subsequent to boarding, a locking mechanism of the sliding mechanism 140 can be unlocked (e.g., in response to a control signal from the controller 156). After the locking mechanism is unlocked, a passenger may manually slide one of the adjustable armrests 143, 144 to a desired location or to a predetermined location. Subsequently, the locking mechanism may be re-engaged to lock the adjustable armrest 143, 144 in place.

Figure 8:
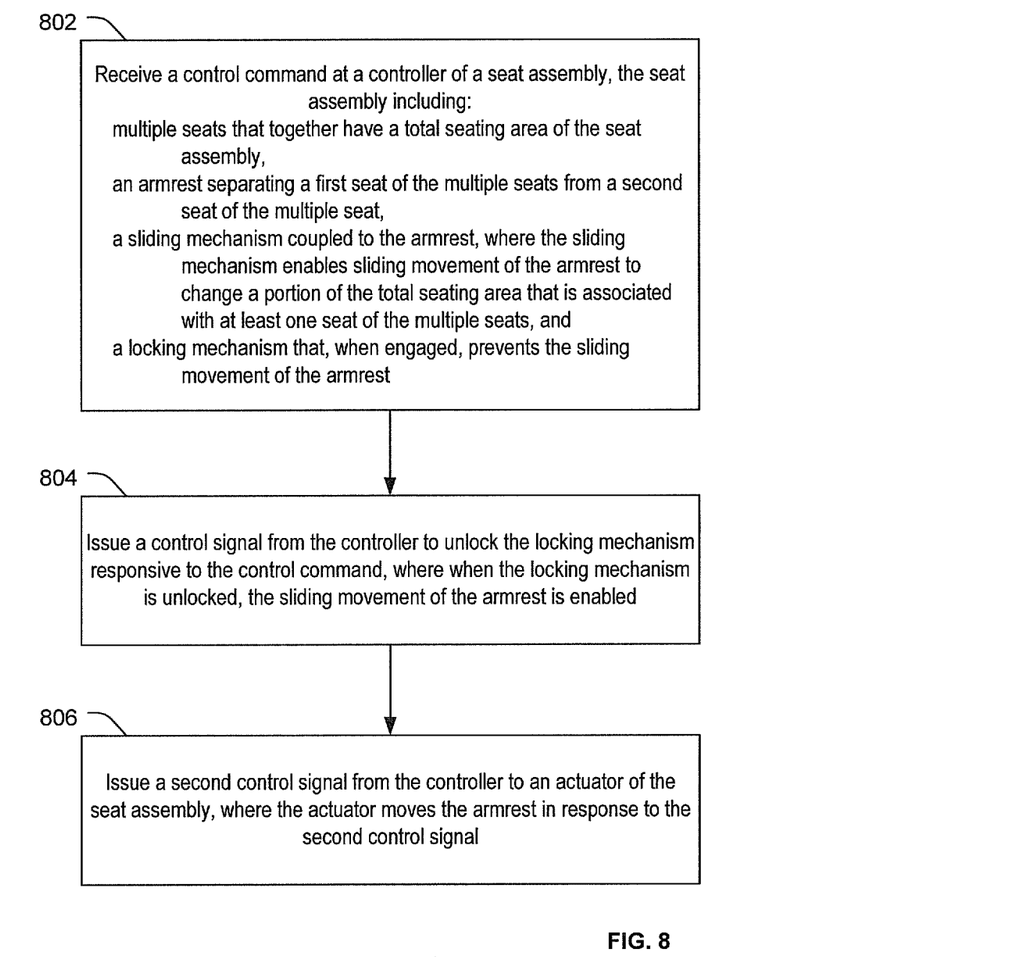
FIG. 8 is a flow chart of a method of adjusting an aircraft seat assembly according to a particular embodiment.

FIG. 8 is a flow chart illustrating a particular embodiment of a method of adjusting the seating configuration of an aircraft seat assembly, such as the aircraft seat assembly 100 described above. The method includes, at 802, receiving a control command at a controller of a seat assembly. The seat assembly including multiple seats that together have a total seating area. The seat assembly may also include an armrest separating a first seat of the multiple seats from a second seat of the multiple seats, and a sliding mechanism coupled to the armrest. The sliding mechanism may enable sliding movement of the armrest to change a portion of the total seating area associated with a particular seat. The seat assembly may further include a locking mechanism that, when engaged, prevents the sliding movement of the armrest.

The method may also include, at 804, issuing a control signal from the controller to unlock the locking mechanism responsive to the control command. The locking mechanism may be unlocked (e.g., disengaged) responsive to the control signal. When the locking mechanism is unlocked, the sliding movement of the armrest is enabled. For example, the locking mechanism may include teeth of the sliding mechanism, a locking pin, or an actuator. When the locking mechanism is unlocked, the movement of the armrest may be performed manually (e.g., by a passenger) in some embodiments and may be performed automatically (e.g., by the actuator) in other embodiments. For example, in a particular embodiment, the method also includes, at 806, issuing a second control signal from the controller to the actuator. The actuator may automatically moves the armrest in response to the second control signal.

In a particular embodiment, the control command is received from an external device based on passenger ticket sales. For example, the external device may include a ticket terminal that sends ticket sales information or configuration information via the control command. In this embodiment, seating configurations of the aircraft may be automatically adjusted based on ticket sales (e.g., before passengers board of the aircraft). In another embodiment, the locking mechanism may be unlocked in response to a signal issued by a portable terminal that is able to unlock the locking mechanism during boarding or subsequent to boarding to accommodate passenger requests. In a particular embodiment, when the armrest slides to change a portion of the total seating area associated with at least one seat (e.g., a seat width of two or more adjacent seats), a seatbelt harness associated with the at least one seat is also moved in order to provide comfortable seating and seatbelt access for each seat.

Figure 9:
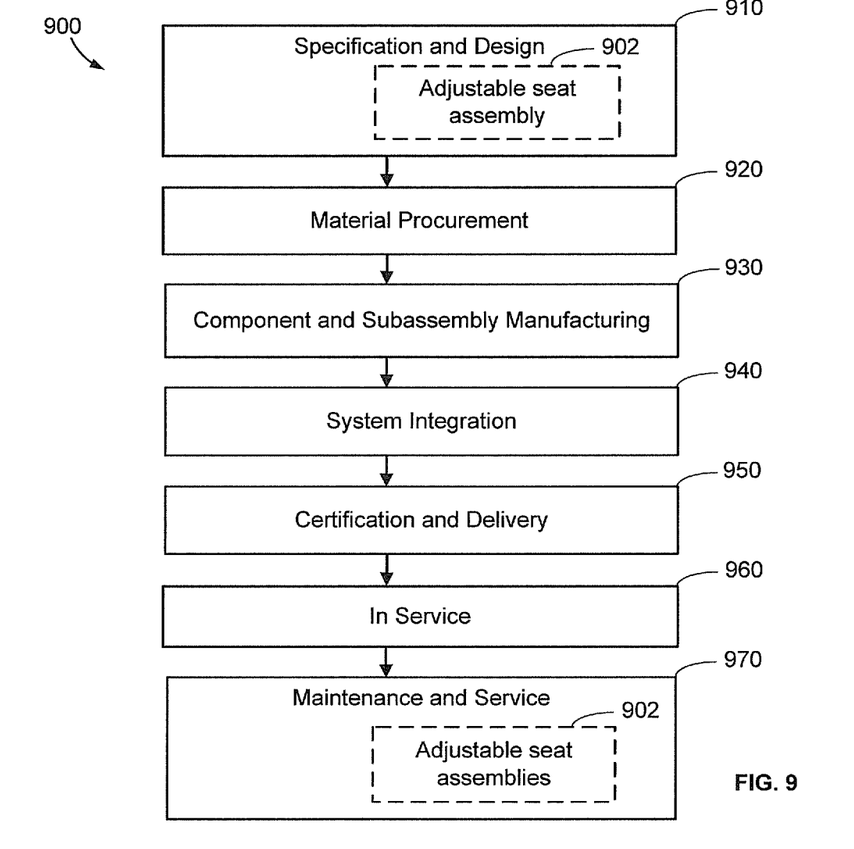
FIG. 9 is a flow diagram of an aircraft production and service methodology.
Figure 10:
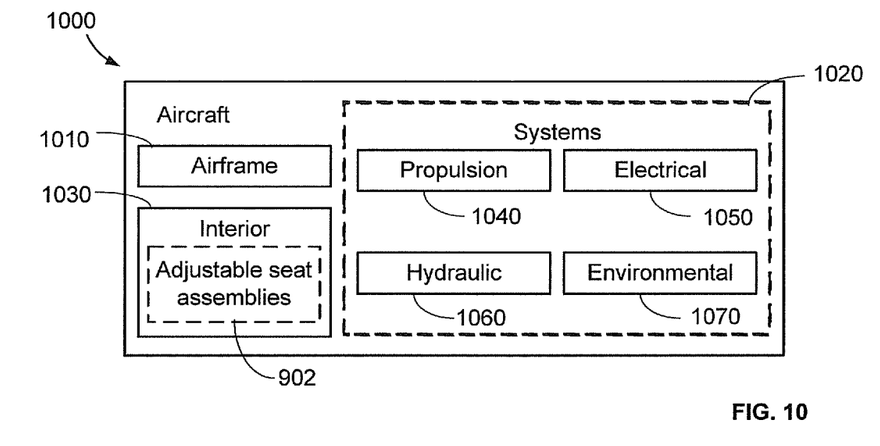
FIG. 10 is a block diagram of functional groups of an aircraft including an adjustable seat assembly.

Embodiments of the disclosure may be described in the context of an aircraft manufacturing and service method 900 as shown in FIG. 9 and an aircraft 1000 as shown in FIG. 10. During pre-production, the method 900 may include specification and design 910 of the aircraft 1000 and material procurement 920. For example, during specification and design 910, one or more adjustable seat assemblies 902 may be specified for the aircraft 1000. One or more of the adjustable seat assemblies 902 may correspond to the aircraft seat assembly 100 described above. During production, component and subassembly manufacturing 930 and system integration 940 of the aircraft 1000 takes place. Thereafter, the aircraft 1000 may go through certification and delivery 950 in order to be placed in service 960. While in service by a customer, the aircraft 1000 may be scheduled for routine maintenance and service 970 (which may also include modification, reconfiguration, refurbishment, and so on). For example, the maintenance and service 970 may include refurbishing the aircraft 1000 to include or to replace the adjustable seat assemblies 902.

Each of the processes or sub-processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, a leasing company, a military entity, a service organization, and so on.

As shown in FIG. 10, the aircraft 1000 produced by the exemplary method 900 may include an airframe 1010 with a plurality of systems 1020 and an interior 1030. In a particular embodiment, the interior 1030 may include the one or more adjustable seat assemblies 902. Examples of high-level systems 1020 include one or more of a propulsion system 1040, an electrical system 1050, a hydraulic system 1060, and an environmental system 1070. Other systems may also be included.

Apparatus and methods embodied herein may be employed during any one or more of the stages of the production and service method 900. For example, components or subassemblies corresponding to the component and subassembly manufacturing 930 may be fabricated or manufactured in a manner similar to components or subassemblies produced while the aircraft 1000 is in service. Similarly, one or more of apparatus embodiments, method embodiments, or a combination thereof may be utilized while the aircraft 1000 is in service, for example and without limitation, during maintenance and service 970. For example, the adjustable seat assemblies may be specified during the specification and design 910, the material procurement 920, the component and subassembly manufacturing 930, and the system integration 940, or may be retrofit during the maintenance and service 970.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, claimed subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. An aircraft seat assembly comprising:
multiple seats together having a total seating area;
an armrest separating a first seat of the multiple seats from a second seat of the multiple seats;
a sliding mechanism coupled to the armrest, wherein the sliding mechanism enables linear movement of the armrest to change a portion of the total seating area that is associated with at least one seat of the multiple seats without changing the total seating area; and
a controller that controls the linear movement of the armrest responsive to a control command.

2. The aircraft seat assembly of claim 1, further comprising a second armrest coupled to the sliding mechanism, the second armrest separating a third seat of the multiple seats from the second seat, wherein the sliding mechanism enables sliding movement to distribute the total seating area between the first seat, the second seat and the third seat.

3. The aircraft seat assembly of claim 2, wherein the linear movement of the armrest enables multiple configurations of the multiple seats, including at least two of:
a first configuration in which the first seat, the second seat and the third seat each have an approximately equal portion of the total seating area;
a second configuration in which the first seat is smaller than the second seat and the third seat is larger than the second seat;
a third configuration in which the first seat is smaller than the second seat and the second seat is larger than the third seat;
a fourth configuration in which the second seat is larger than the first seat and is larger than the third seat; and
a fifth configuration in which the first seat and the third seat have an approximately equal portion of the total seating area, and the second seat has a smaller portion of the total seating area.

4. The aircraft seat assembly of claim 1, wherein the sliding mechanism enables the linear movement of the armrest through at least a ten inch range of motion.

5. The aircraft seat assembly of claim 1, further comprising a locking mechanism to prevent the linear movement of the armrest.

6. The aircraft seat assembly of claim 5, wherein the controller controls the linear movement of the armrest by selectively locking or unlocking the locking mechanism responsive to the control command.

7. The aircraft seat assembly of claim 1, further comprising an actuator coupled to the armrest, wherein the actuator is operable to move the armrest linearly along the sliding mechanism.

8. The aircraft seat assembly of claim 7, wherein the controller controls the linear movement of the armrest by using the actuator to automatically reposition the armrest responsive to the control command.

9. The aircraft seat assembly of claim 1, wherein the control command is received from a device external to an aircraft associated with the aircraft seat assembly and is generated based on passenger tickets associated with the aircraft.

10. The aircraft seat assembly of claim 1, wherein the control command is received from a device internal to an aircraft associated with the aircraft seat assembly and is generated responsive to purchase of a particular seating arrangement by a passenger.

11. The aircraft seat assembly of claim 1, further comprising a seat belt harness coupled to the armrest, wherein the linear movement of the armrest causes corresponding linear movement of the seat belt harness.

12. An aircraft comprising:
a seat assembly comprising:
multiple seats together having a total seating area of the seat assembly;
an armrest separating a first seat of the multiple seats from a second seat of the multiple seats;
a sliding mechanism coupled to the armrest, wherein the sliding mechanism enables linear movement of the armrest to change a portion of the total seating area that is associated with at least one seat of the multiple seats without changing the total seating area; and
a controller that controls the linear movement of the armrest responsive to a control command.

13. The aircraft of claim 12, further comprising an actuator coupled to the armrest, wherein the controller controls the linear movement of the armrest by using the actuator to automatically repositioning the armrest responsive to the control command.

14. The aircraft of claim 12, further comprising a locking mechanism to prevent the linear movement of the armrest, wherein the controller controls the linear movement of the armrest by selectively locking or unlocking the locking mechanism responsive to the control command.

15. The aircraft of claim 12, wherein the control command is generated responsive to purchase of a particular seating arrangement by a passenger.

16. The aircraft of claim 12, wherein the control command is generated by a portable seat configuration terminal.

17. A method comprising:
receiving a control command at a controller of a seat assembly, the seat assembly including:
multiple seats that together have a total seating area of the seat assembly,
an armrest separating a first seat of the multiple seats from a second seat of the multiple seats;
a sliding mechanism coupled to the armrest, wherein the sliding mechanism enables linear movement of the armrest to change a portion of the total seating area that is associated with at least one seat of the multiple seats without changing the total seating area; and
a locking mechanism that, when engaged, prevents the linear movement of the armrest; and
issuing a control signal from the controller to unlock the locking mechanism responsive to the control command, wherein when the locking mechanism is unlocked, the linear movement of the armrest is enabled.

18. The method of 17, wherein the locking mechanism includes a plurality of teeth of the sliding mechanism.

19. The method of 17, wherein the control command is received from an external device based on passenger ticket sales.

20. The method of 17, wherein the seat assembly further includes an actuator, the method further comprising issuing a second control signal from the controller to the actuator, wherein the actuator moves the armrest in response to the second control signal.

* * * * *